United States Patent Office 3,119,082
Patented Jan. 21, 1964

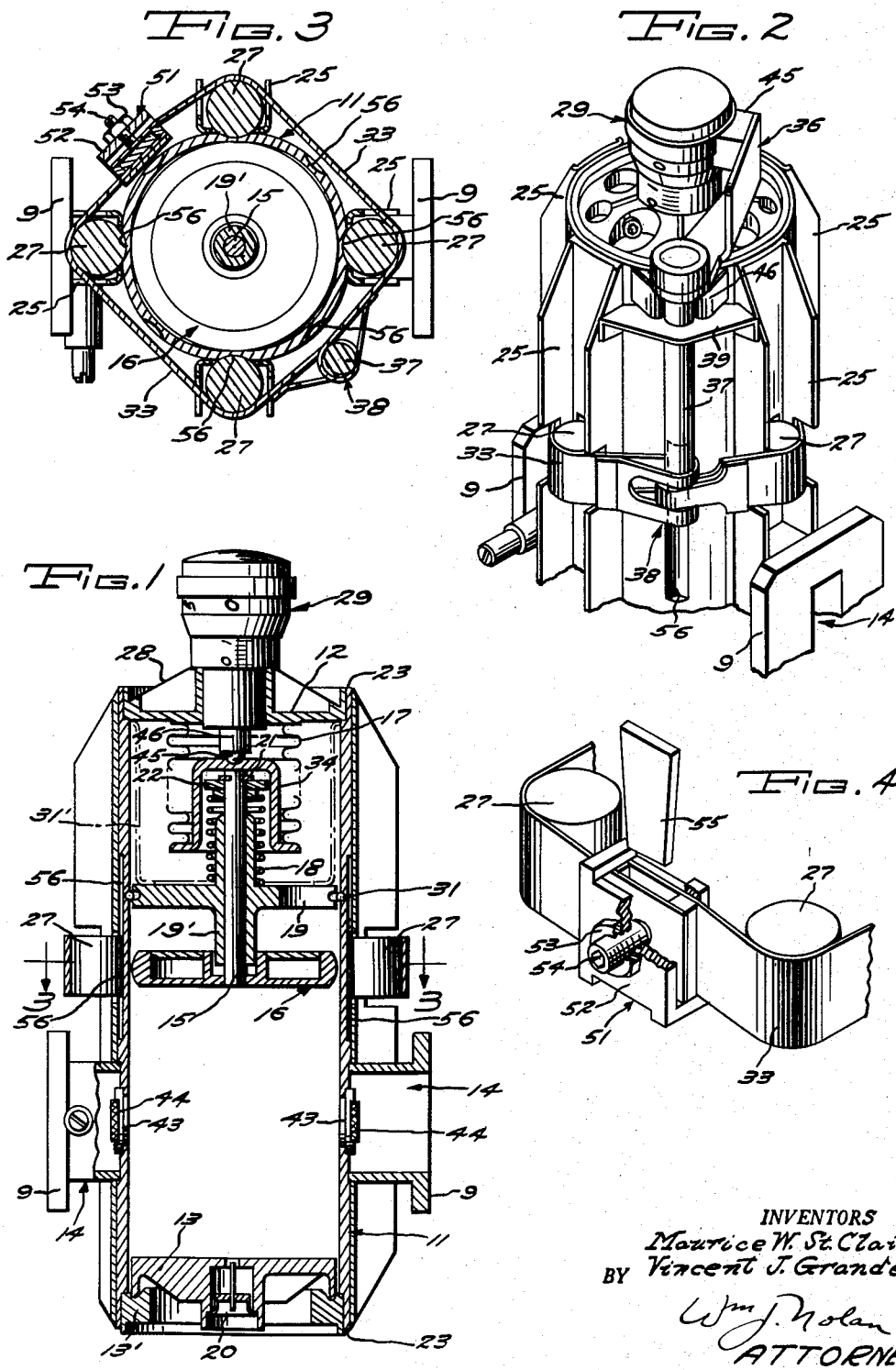

3,119,082
TUNABLE CAVITY RESONATOR
Maurice W. St. Clair, Menlo Park, and Vincent J. Grande, Palo Alto, Calif., assignors to Varian Associates, Palo Alto, Calif., a corporation of California
Filed Mar. 22, 1960, Ser. No. 16,707
9 Claims. (Cl. 333—83)

This invention relates to ultra high frequency apparatus and more particularly to cavity resonators for use, for example, as filters or as stalos in stabilizing the frequency of local oscillator sources such as reflex klystrons and the like.

It is desirable that cavity resonators or stalos of the present type be tunable over a range of resonant frequencies and once tuned, remain locked in position during operation so that their resonant frequency will not change. In order to assure a fixed and accurate dimension of the resonant cavity, it is further desirable that a variable tuning plate or wall make rigid mechanical contact with the inside wall of the resonant cavity.

It is, therefore, the main object of the present invention to provide a novel tunable cavity resonator in which a constant resonant frequency may be maintained throughout operation.

One feature of the present invention is the provision of a tunable cavity resonator wherein the cylindrical wall of the resonant cavity is forced against the periphery of the tuner plate thus effecting rigid mechanical contact between the wall and the tuner plate.

Another feature of the present invention is the provision of a tunable cavity resonator wherein the tuner, which is a plunger inside the resonant cavity, is clamped into position by means of a cam operated strap around the exterior of the cavity assembly.

Another feature of the present invention is the provision of a tunable cavity resonator of the above featured type wherein the cam locking handle comes into contact with the actuating micrometer to prevent its turning.

Still another feature of the present invention is the provision of a tunable cavity resonator effecting rigid mechanical contact between the inside wall of the cavity resonator and the tuner plate or wall wherein all component parts are of low expansion metal such as Invar and in which the rigid locking feature allows accurate control of the resonator's frequency vs. temperature coefficient and the attendant possibility of accurate compensation by means introduced at the opposite end plate.

These and other features and advantages of the present invention will be more apparent after a perusal of the following specification taken in connection with the accompanying drawings wherein, FIG. 1 is a longitudinal cross section view of a cavity resonator embodying the present invention, FIG. 2 is an isometric view of the cavity resonator showing the cam operated strap and the cam handle, FIG. 3 is a cross sectional view of the cavity resonator taken at 3—3, and FIG. 4 is an enlarged view of the clamping assembly for the metal strap.

Referring now to the drawings, the cavity resonator utilized to describe the present invention comprises a hollow cylindrical main body member 11 made, for example, of Invar which has a low thermal coefficient of expansion. A pair of coupling holes 43, which may be sealed with dielectric windows 44 to permit hermetic sealing of the cavity if desired, are provided in the sides of the main body member 11. Input and output waveguides 14, also of Invar, are brazed to the main body member 11 over these coupling holes. Flanges 9 may be brazed to the outer ends of the waveguides 14 and serve to couple the cavity resonator to input and output circuit members.

End plates 12 and 13 are mounted over the open ends of the main body member 11 by welding at junctions 23, it being understood that these end plates 12 and 13 may be secured to main body member 11 in any effective manner so desired. The end plate 12 is provided with stiffening ribs 28 giving added strength to the resonator. End plate 12 is made of Invar the same as main body 11. End plate 13 is steel and its associated rim 13' is the same metal as the main body 11, that is Invar, to compensate for changes in temperatures that may occur in the cavity resonator as fully described and claimed in co-pending application, Serial No. 730,609, entitled "Temperature Compensation Cavity Resonator." Mounted in a central aperture in end plate 13 is a vacuum detection assembly 20 for use in detecting the presence of gas in the resonant cavity.

Mounted in a central aperture of end plate 12 is a micrometer tuner mechanism 29 comprising a bearing 45 on the inner end of the actuating shaft 46. Bearing 45 is adapted to engage a shaft 15 through bellows end cap 34, the end cap being flanged at its open end and welded to one end of cylindrical flexible bellows 17, the other end of flexible bellows 17 being welded to end plate 12. Bellows 17 permits hermetic seal of the cavity resonator if desired. Shaft 15 extends downward through a molded hollow tubular shaft and support plate assembly 19' and 19, the hollow tubular shaft 19' being rigidly supported by support plate 19 which is a central hub with radiating blades placed so that the radiating blades form a curved surface having a radius slightly less than the inside radius of the cavity main body member 11. Snap ring 31 is provided to securely fasten the support plate 19 and hollow tubular shaft 19' in position, snap ring 31 being fitted into grooves in the main body member 11 and support plate 19. It is noted that any other suitable means may be provided to secure the support plate 19 and hollow tubuar shaft 19' assembly into position, one such means being a hollow cylinder 31' shown in phantom, flanged inwardly at the bottom and there brazed to support plate 19 and outwardly flanged at the top where it is positioned to main body member 11. Shaft 15 is held in position by the hollow tubular shaft 19', by metal spring 18 positioned between the top of support plate 19 and a retaining washer 22 beam, retaining washer 22 secured by a retainer 21 near the top of shaft 15. Mounted on the bottom of shaft 15 is tuning plate or wall 16 which forms the movable portion of the resonant cavity and provides the variable dimension of the resonant tuning cavity.

Positioned on the outer wall of the main body member 11 are four symmetrically placed, solid rollers 27 made, for example, of Invar, held in position by ribs 25 which are channeled brackets welded to the exterior of the main body member 11. These metal rollers 27 which form support for a strap 33 made, for example, of Invar, are set in four of the eight slots or grooves 56 cut in the main body member 11. Strap 33 is fastened at one side of main body 11 by a cam actuated assembly generally shown at 38 in its closed or locked position and fastened at the other side of main body 11 by a clamping assembly 51 shown in detail in FIG. 4. Cam assembly 38 is operated by handle 36 through locking shaft 37, held in position by a lock bracket 39 and held in spring tension by locking spring 46. The handle 36 is provided with a member 45 made of rubber or some other like substance which serves to hold the actuating micrometer 29 in its desired position.

Clamp assembly 51 is provided to supply proper tension to strap 33 so that, when cam locking handle 36 is in open position, tuning plate or wall 16 may be moved to another desired position in the cavity resonator and, when cam locking handle 36 is in closed position, metal strap 33 will constrict main body member 11 at four points to securely hold tuning plate or wall 16 in position in the cavity resonator.

A slotted metal sleeve 52 made, for example, of Invar, is provided having slots therein for inserting the ends of metal strap 33 in an overlapping manner (see FIG. 4). Wedge 55, made of the same material as metal sleeve 52, is inserted between the overlapping ends of metal strap 33, and the insertion depth varies the strap tension in the lock position. Metal sleeve 52 is centrally apertured on one side and a set screw 54 passes through the aperture in sleeve 52 and clamps the ends of metal straps 33 into position at proper tension in sleeve 52. Lock nut 53 securely locks set screw 54 into the sleeve 52.

Operation of the tunable stalo cavity resonator is as follows:

With the handle 36 in an unlocked position, actuating micrometer 29 is fixed at any desired setting depending on the frequency at which the stalo is to be operated. As an example, let us assume that the desired setting of the actuating micrometer will cause the screw tuner mechanism to go down into the cavity, forcing bearing 45 against bellows end cap 34. Bellows end cap 34 in turn forces shaft 15, acting against spring 18, down through the hollow shaft 19' of the supporting assembly. Tuning plate 16, fixed to shaft 15, is thereby moved down into the resonant cavity, changing the dimensions of the cavity and thereby changing its resonant frequency. When the desired resonant frequency is obtained, to insure proper operation of the cavity resonator, the inside wall of the resonant cavity should make rigid mechanical contact with the periphery of tuning plate 16, firmly locking it into position. The condition necessary to insure constant dimension of the cavity resonator throughout operation under conditions of vibration and temperature change is obtained by means of cam operated strap 33. When the desired setting of the actuating micrometer is obtained, cam locking handle 36 is moved inwardly, the direction towards the actuating micrometer, as seen in FIG. 2. This adjusts cam assembly 38, through cam locking shaft 37, and forces strap 33 tightly against the metal rollers 27. The force of the strap against the metal rollers distorts the wall of the main body member 11 against the periphery of tuning plate 16, as seen in FIG. 3, firmly locking the tuning plate 16 into position. At the same time, member 45 comes into contact with actuating micrometer 29 preventing its turning.

It is noted that the cam operated strap aids in the operation of the temperature compensating end plate 13 by rigidly fixing the dimension of the cavity resonator inner chamber wall. Any expansion or contraction due to temperature change in the remainder of the cavity resonator elements such as the shaft 15 will in no way affect the fixed dimension of the inner chamber and any change of dimension of the inner chamber due to temperature will be compensated by end plate 13.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A tunable cavity resonator apparatus comprising a hollow main body member including a resilient wall portion, a first end wall in said main body member and a movable wall member comprising a tuning wall extending into the body from the opposite end wherein said main body member, first end wall and tuning wall form a cavity resonator chamber, tuning means for moving said tuning wall within said main body member to thereby selectively vary the size of the cavity resonator chamber, and means adapted to constrict the main body member at said resilient wall portion into firm engagement with the periphery of said movable tuning wall preventing any movement thereof.

2. A tunable cavity resonator apparatus as claimed in claim 1 wherein said means adapted to constrict the main body member comprises a strap encircling the exterior of the main body member at said resilient wall portion and means for loosening said strap to permit tuning movement of said tuning wall in said body member and for subsequently tightening said strap to constrict said resilient wall portion.

3. A tunable cavity resonator apparatus as claimed in claim 1 wherein said means adapted to constrict the main body member includes rollers positioned around said main body member at said resilient wall portion, said strap encircling the exterior of the main body member and engaging said rollers, and a cam assembly mounted on the main body member for tightening and loosening said strap.

4. A tunable cavity resonator apparatus as claimed in claim 3 wherein said cam assembly includes a cam locking handle, said cam locking handle having means attached thereto to prevent movement of the tuning means when said strap is tightened about said body.

5. A tunable cavity resonator apparatus as claimed in claim 4 wherein said tuning means includes a micrometer screw for moving said tuning wall and wherein said means attached to said cam locking handle to prevent movement of the tuning means comprises locking means for engaging said micrometer screw.

6. A tunable cavity resonator apparatus as claimed in claim 5 wherein said means attached to said cam locking handle is a resilient gripping member attached to the inner portion of said cam handle.

7. The apparatus as claimed in claim 2 wherein said cavity resonator is hermetically sealed and includes vacuum detection means.

8. A tunable cavity resonator apparatus comprising a hollow cylindrical main body member, said main body member having a plurality of spaced-apart longitudinal grooves therein, a first end-wall in said main body member, and a movable wall member comprising a tuning wall extending into the body member from the opposite end wherein said main body member, first end wall and tuning wall form a cavity resonator chamber, tuning means for moving said tuning wall within said main body member to thereby selectively vary the size of the cavity resonator chamber, and means adapted to force said cylindrical main body member inwardly at alternate ones of the grooves, said main body member being distorted outwardly at the other alternate grooves, said inward movement causing the main body member to make firm engagement with the periphery of said movable tuning wall thereby preventing further movement thereof within said main body member.

9. A tunable cavity resonator apparatus as claimed in claim 8 wherein said means adapted to force said cylindrical body inwardly comprises a plurality of rollers positioned around said main body and set in said alternate ones of said longitudinal grooves and a strap encircling said main body and engaging said rollers including means for tightening said strap to produce the inwardly directed force on said rollers.

References Cited in the file of this patent

UNITED STATES PATENTS

| | | |
|---|---|---|
| 2,404,116 | Wolowicz | July 16, 1946 |
| 2,603,763 | Neher | July 15, 1952 |
| 2,882,401 | Bryden | Apr. 14, 1959 |
| 2,946,027 | Gerard | July 19, 1960 |